United States Patent [19]

Kasahara

[11] 3,909,015

[45] Sept. 30, 1975

[54] RING SEAL ASSEMBLY FOR A ROTARY PISTON INTERNAL COMBUSTION ENGINE

[75] Inventor: Gozo Kasahara, Urawa, Japan

[73] Assignee: Nissan Motor Company Limited, Yokohama, Japan

[22] Filed: July 9, 1974

[21] Appl. No.: 486,851

[30] Foreign Application Priority Data

July 12, 1973  Japan.............................. 48-83165

[52] U.S. Cl. .............................. 277/81 P; 418/412
[51] Int. Cl.² ......................................... F16J 15/38
[58] Field of Search ............ 277/81 R, 81 P, 86, 87; 418/412

[56] References Cited

UNITED STATES PATENTS

| 3,506,275 | 4/1970 | Moriyama .......................... 277/81 P |
| 3,796,436 | 3/1974 | Kurio et al. ........................ 277/81 P |
| 3,797,976 | 10/1972 | Moriya et al. ....................... 418/142 |
| 3,836,296 | 9/1974 | Sakamaki et al. ................... 418/142 |

Primary Examiner—Robert I. Smith

[57] ABSTRACT

A seal ring is received in a ring groove of a rotor in order to render the ring groove fluid tight.

9 Claims, 4 Drawing Figures

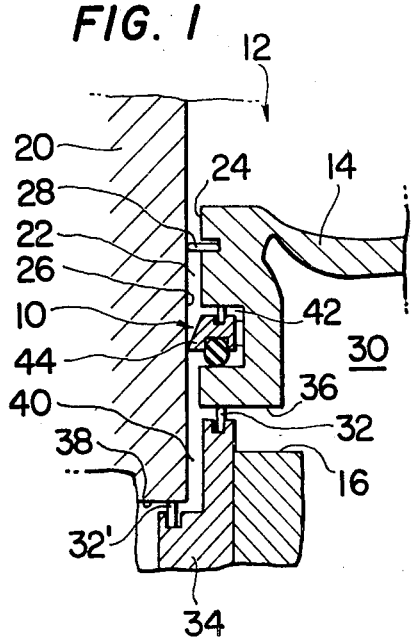
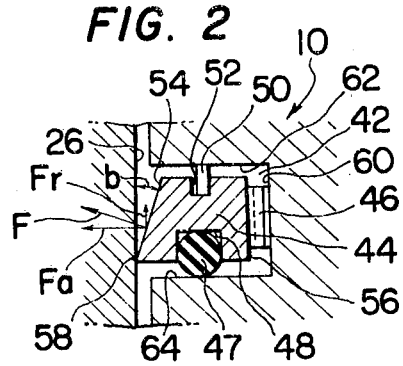
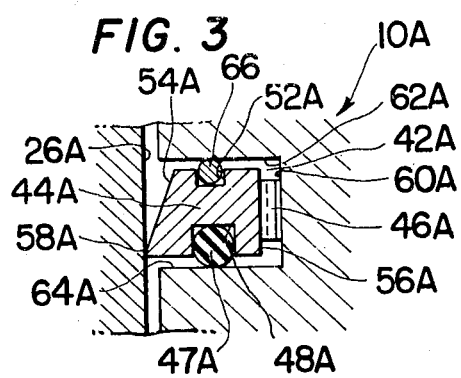
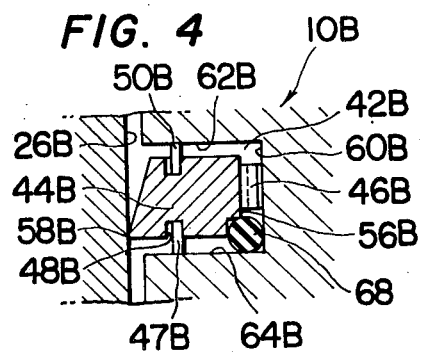

RING SEAL ASSEMBLY FOR A ROTARY PISTON INTERNAL COMBUSTION ENGINE

The present invention relates to oil seals for rotary internal combustion engines, and more particularly to a ring seal assembly in a ring groove in an end or side wall surface of a rotary piston internal combustion engine.

Rotary piston internal combustion engines to which the present invention is applicable normally comprises an outer body or housing and an inner body or rotor eccentrically mounted on a crankshaft for rotation in the housing. The outer peripheral surface of the rotor and the adjacent housing walls define a plurality of working chambers which, during relative rotation of the rotor, vary in volume. The chambers are preferably sealed from one another by means disposed between the rotor and housing.

It has been conventionally proposed to dispose a piston ring in a peripheral groove in a disk secured to the eccentric of the crankshaft to abut a radially disposed annular wall formed in the rotor end wall or face, which piston ring functions to prevent liquid coolant and/or lubricant, flowing through the rotor, from passing into the working chambers, another piston ring in another peripheral groove in the disk to abut a radially disposed annular wall formed in the housing end wall, and a seal ring and a wavy spring washer in a ring groove in the rotary piston end wall to abut adjacent end wall of the housing. The ring seal assembly also includes an O-ring to seal the space between inner axially extending radial wall of the seal ring and the ring groove. A blow-by gas is introduced into annular space about the disk defined and sealed by the seal ring and inner piston rings. The seals by the piston rings are effective as far as blow-by gas in the annular space is maintained sufficiently high to bias the piston rings axially into abutment against the groove walls. However, when the engine is braking during deceleration, the pressure of the blow-by gas is too low to effect a positive seal. This is because the blow-by gas applied to inner radially extending axial end wall of the seal ring to increase the sealing effectiveness causes the seal ring to disengage from the adjacent end wall of the housing. With this oil ring assembly, therefore, when vacuum exists in the ring groove, the seal ring loses firm engagement with the adjacent housing end wall and permits the blow-by gas to leak from the annular space. Hence, in a conventional rotary piston internal combustion engines, oil consumption is unacceptably high.

It is accordingly an object of the present invention to provide a ring seal assembly for a rotary piston internal combustion engine, which prevents creation of vacuum in a ring groove in an end wall of rotor.

The above and other objects, features and advantages of the present invention will become apparent from the following description of three preferred embodiments of the invention with reference to the accompanying drawings, in which:

FIG. 1 is a fragmentary sectional view of a rotary piston internal combustion engine having a ring seal assembly according to a first embodiment of the present invention;

FIG. 2 is an enlarged, fragmentary sectional view of the ring seal assembly shown in FIG. 1;

FIG. 3 is a fragmentary sectional view, similar to FIG. 2, showing a second embodiment of the present invention; and FIG. 4 is a fragmentary sectional view, similar to FIG. 3, showing a third embodiment of the present invention.

Now referring to the drawings and, more particularly, FIGS. 1 and 2, the reference numeral 10 generally designates a ring seal assembly according to one embodiment of the present invention, which assembly is disposed in a rotary piston internal combustion engine 12. The rotary engine 12 comprises a rotor 14 which is mounted on the eccentric portion 16 of a crankshaft (not shown) for rotation within a housing consisting of a peripheral wall (not shown) and two opposite end walls 20 (only one of which is shown). The surface of the peripheral wall has in cross-section, an epitrochoidal shape so that, with the rotor 14 of three-sided configuration, a plurality of working chambers (not shown) are formed which successively expand and contract in volumetric size as the rotor 14 rotates. To render the working chambers as fluid tight as possible, apex seals (not shown) are carried by the rotor at the side walls thereof to abut the peripheral wall surface. To seal the interstices or space 22 between the face 24 of rotor 14 and the surface 26 of end wall 20, a side seal means 28 is mounted on the face 24 of rotor 14 to impinge surface 26 and thereby minimize gaseous fluid leakage from the combustion chambers (not shown) in space 22. To prevent liquid leakage, such as lubricating and/or cooling oil, from flowing out of the interior 30 of rotor 14 into the combustion chambers (not shown), piston rings 32 and 32' disposed in peripheral grooves in a disk 34 abut the axially extending annular inner wall 36 of the rotor 14 and the annular surface 38 of the end wall 20, respectively. To prevent gas leakage from an annular space 40 into the combustion chamber (not shown) when excessive vacuum exists in working chamber during suction phase thereof, as would occur when the engine is braking during deceleration, the ring seal assembly 10, according to the invention is disposed in a ring groove 42 in the rotor end face 24.

As best illustrated in FIG. 2, a seal ring 44 is received in ring groove 42 and a biasing means 46, such as a wavy spring washer, disposed between the seal ring 44 and the ring groove 42 urges the seal ring 44 axially outwardly from the ring groove 42. A first auxiliary annular seal means 47, such as an O-ring, is carried by the seal ring 44 at inner peripheral groove 48 thereof. A second auxiliary annular seal means 50, such as a split piston ring, is carried by the seal ring 44 at outer peripheral groove 52.

The seal ring 44 has outer and inner radially extending axial end surfaces 54 and 56. The outer axial end surface 54 is at an angle b to the adjacent end wall surface 26 so that a radially inner peripheral edge 58 points toward the adjacent end wall and sealingly engages with the adjacent end wall surface 26. The biasing means 46 is disposed between the inner axial surface 56 of seal ring 44 and the radially extending surface 60 of ring groove 42 and urges the seal ring 44 axially outwardly from the ring groove 42 so that the edge 58 of the seal ring 42 sealingly engages with the adjacent end wall surface 26. The piston ring 50 sealingly engages with outer axially extending radial surface 62 of ring groove 42 and the O-ring 47 sealingly engages with inner axially extending radial surface 64 of ring groove 42 in order to render the ring groove 42 fluid tight. It will thus be noted that vacuum will not occur in space between the inner axial surface 56 and the surface 60 of ring groove 42 during operation of engine.

When vacuum acts on angled outer axial end surface 54, as engine is braking during deceleration, a force F normal to and outward of the surface 54 occurs and its componential force Fa forces edge 58 of seal ring 44 against the adjacent end wall surface 26. Thus since the magnitude of force Fa increases as angle $b$ decreases, it is preferable to make angle $b$ smaller.

It will now be understood that since ring groove 42 is made fluid tight and seal ring has angled surface 54, seal ring 44 is forced against the adjacent end wall surface 46, when engine is braking during deceleration, by biasing means 46 and force Fa.

The piston ring 50 may preferably be pin connected or keyed to the ring groove 42 for conjoint rotation with the rotor 14.

In FIG. 3 is shown ring seal assembly 10A according to another preferred embodiment of the present invention. The ring seal assembly 10A differs from ring seal assembly 10 shown in FIGS. 1 and 2, essentially only in that a metal annular seal 66 is disposed in an outer peripheral groove 52A of seal ring 44A in place of piston ring 50. The parts in ring seal assembly 10A corresponding to like parts of inner seal assembly 10, are designated by the same number but with the suffic A added thereto.

In ring seal assembly 10A, the metal annular seal 66 may be connected or keyed to ring groove 42A for conjoint rotation with rotor (not shown). In place of the metal annular seal 66, an O-ring (not shown) made of a high-temperature elastomer may be used.

In FIG. 4 is shown a ring seal assembly 10B according to a third embodiment of the present invention wherein parts corresponding to like parts of the shown in FIGS. 1 and 2 are designated by the same reference number but with the suffix B added thereto. The ring seal assembly 10B essentially differs from the ring seal assembly in that O-ring 68 is disposed between radially extending surface 60B of ring groove 42B and inner axial end surface 56B of seal ring 42B and a piston ring 47B is provided in inner peripheral groove 48B of seal ring 44B to render ring groove 42B fluid tight. The advantage of the ring seal assembly 10B over the ring seal assemblies 10 and 10A is that the loading of O-ring 68, which serves as a static seal, is axial rather than radial and, therefore, the seal ring 44B is free to follow the adjacent end wall surface 26B.

From the preceding description, it will be appreciated that the lubricating and/or cooling oil consumption in a rotary internal combustion engine assembled with a ring seal assembly of the present invention is reduced.

Since, in an ring seal assembly of the present invention, the tilt of seal ring in ring groove is prevented and the edge is always properly maintained in sealing engagement with the adjacent end wall, it is very durable.

Although a few embodiments of the present invention have been illustrated and described in detail, it is to be understood that the invention is not limited thereto. Various changes can be made in the arrangement of parts without departing from the spirit and scope of the invention as the same will now be understood be those skilled in the art.

What is claimed is:

1. A ring seal assembly in a rotary piston internal combustion engine having a rotor formed with a ring groove in an end face thereof, comprising: a seal ring received in the ring groove and urged out of the ring groove, and a plurality of auxiliary seals disposed between the ring groove and the seal ring to render the ring groove fluid tight, the first of the auxiliary seals being disposed between an inner axially extending radial surface of the seal ring and an inner axially extending radial surface of the ring groove, the second of the auxiliary seals being disposed between an outer axially extending radial surface of the seal ring and an outer axially extending radial surface of the ring groove, in which said second auxiliary seal is a metal annular seal.

2. A ring seal assembly as claimed in claim 1, in which said first auxiliary seal is an O-ring seal.

3. A ring seal assembly in a rotary piston internal combustion engine having a rotor formed with a ring groove in an end face thereof which faces an end wall of a housing, comprising a seal ring received in the ring groove, a biasing means urging the seal ring out of the ring groove into sealing engagement with the end wall of the housing and a first auxiliary seal and second auxiliary seal disposed between the ring groove and the seal ring to render the ring groove fluid tight, the first auxiliary seal being disposed between an inner axially extending radial surface of the seal ring and an inner axially extending radial surface of the ring groove, the second auxiliary seal being disposed between an outer axially extending radial surface of the seal ring and an outer axially extending radial surface of the ring groove, the improvement being in that said seal ring has an inner peripheral groove and an outer peripheral groove, said seal ring carrying the first auxiliary seal at the inner peripheral groove thereof and the second auxiliary seal at the outer peripheral groove thereof.

4. The improvement as claimed in claim 3, in which said first auxiliary seal is an O-ring seal.

5. The improvement as claimed in claim 3, in which said second auxiliary seal is a compression ring seal urged radially outwardly into sealing engagement with the outer axially extending radial surface of the ring groove.

6. The improvement as claimed in claim 5, in which said second auxiliary seal is a split piston ring.

7. The improvement as claimed in claim 5, in which said second auxiliary seal is a metal annular seal.

8. The improvement as claimed in claim 3, further comprising an O-ring seal disposed between an inner axial end surface of the seal ring and a radially extending bottom surface of the ring groove.

9. The improvement as claimed in claim 8, in which said first auxiliary seal is a split piston ring.

* * * * *